April 30, 1963 A. MOUSSET 3,087,222
CENTRIFUGING MACHINE FOR THE MANUFACTURE OF
CEMENT PIPES AND OTHER APPLICATIONS
Filed Sept. 7, 1960 5 Sheets-Sheet 2

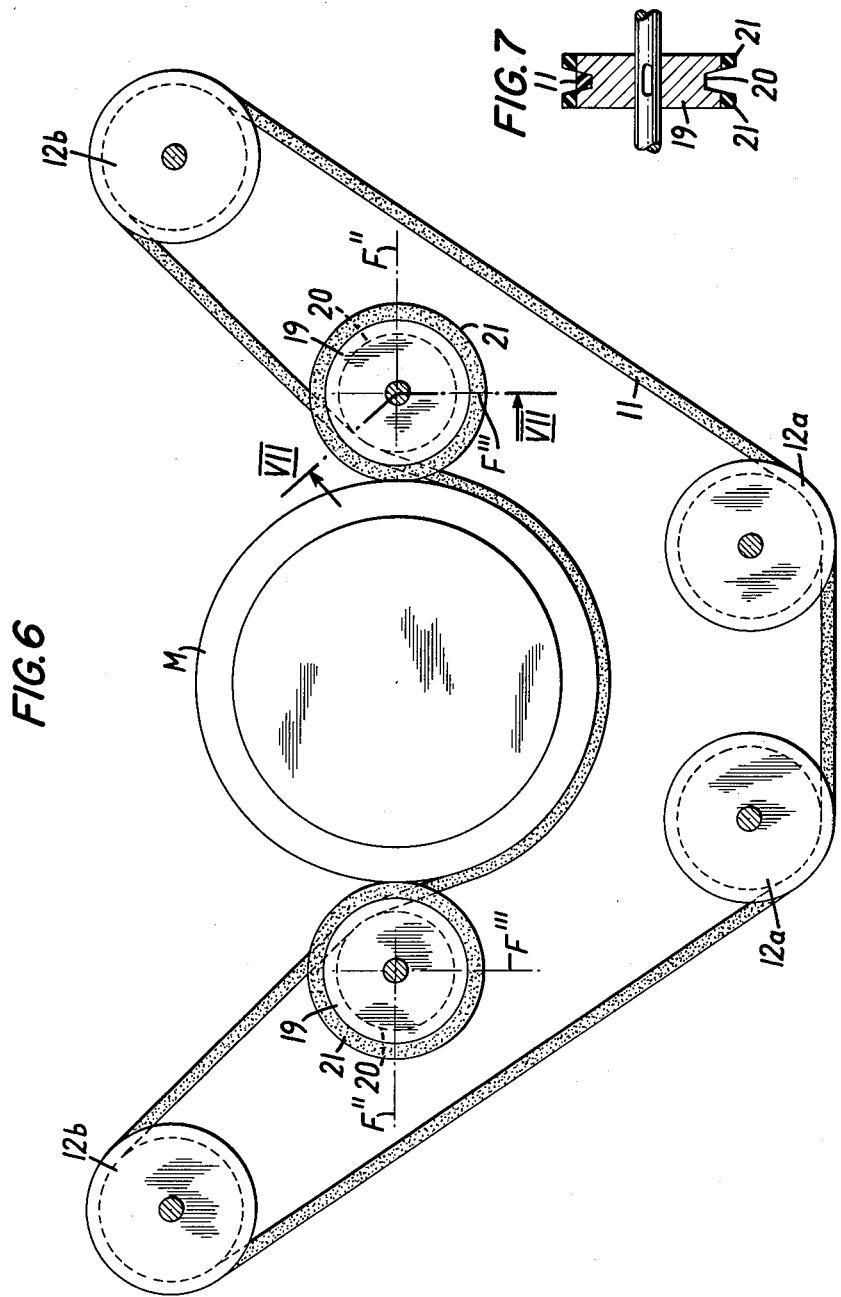

United States Patent Office 3,087,222
Patented Apr. 30, 1963

3,087,222
CENTRIFUGING MACHINE FOR THE MANUFACTURE OF CEMENT PIPES AND OTHER APPLICATIONS
André Mousset, Paris, France, assignor to Union Siderurgique et Industrielle, Paris, France, a company of France
Filed Sept. 7, 1960, Ser. No. 54,413
Claims priority, application France Sept. 9, 1959
1 Claim. (Cl. 25—30)

The present invention relates to a centrifuging machine for the manufacture of cement pipes and other applications of the kind in which a mould, to which the material to be centrifuged is introduced, is carried and driven in rotation by belts, resting on a continuous side in the form of a cradle, of the said belts.

In machines of this type, there are frequently observed undesirable jolting movements of the mould while the latter is driven in rotation. In order to remedy this drawback, it has already been proposed to prevent any difference from subsisting, however small, between the linear speeds of one carrier belt to the other, in particular in accordance with an arrangement described in French Patent No. 1,199,092 issued on June 11, 1958 in the name of André Mousset for "A Machine for Centrifuging Pipes" and which consists, amongst other features, in driving trapezoidal carrier belts from their base instead of by their sides. It has also been previously proposed to give the belts various kinds of circuits, but these latter machines are not of the type indicated above, in which the mould rests on a continuous side of the belts in the form of a cradle, and does not therefore offer the advantages inherent with this type.

The present invention has for its object a machine for the centrifugal manufacture of cement pipes and other applications, of the type referred to above, in which the mould rests on a continuous side in the form of a cradle, of the carrier belts, which is free from the various drawbacks previously indicated.

In accordance with the invention, in a machine of this type guiding means are arranged on each side of the mould and co-operate with said mould and/or with the side forming a cradle of the carrier belts, by limiting the lateral shaking movement of the said mould by a pre-determined play which is either nil or extremely small. These guiding means comprise an adjusting device which is movable in one or more directions so as to adapt itself to the mould irrespective of the diameter of the said mould. In this way, the mould can be strictly maintained on a substantial sector, preferably of the order of 160°, and has remarkable stability. For this reason, very high speeds of rotation can be contemplated, which constitutes a determining factor in the centrifuging of concrete. But outside this favourable enveloping sector, the mould is held in a regulated manner between the obstacles which may constitute the guiding means, thereby preventing all risk of jolting.

The guiding means in accordance with the invention consist either of auxiliary belts independent of the carrier belts but adjacent to them and driven at the same speed, or of auxiliary pulleys over which the carrier belts pass.

The special features and advantages of the invention will further be brought out from the description which follows below of forms of embodiment selected by way of example, reference being made to the accompanying drawings in which:

FIG. 6 is a diagrammatic view in elevation of a third form of construction of machine according to the invention.

FIG. 7 is a view of a guiding pulley of this machine in cross-section, taken along the broken line VII—VII of FIG. 6.

Figure 1:
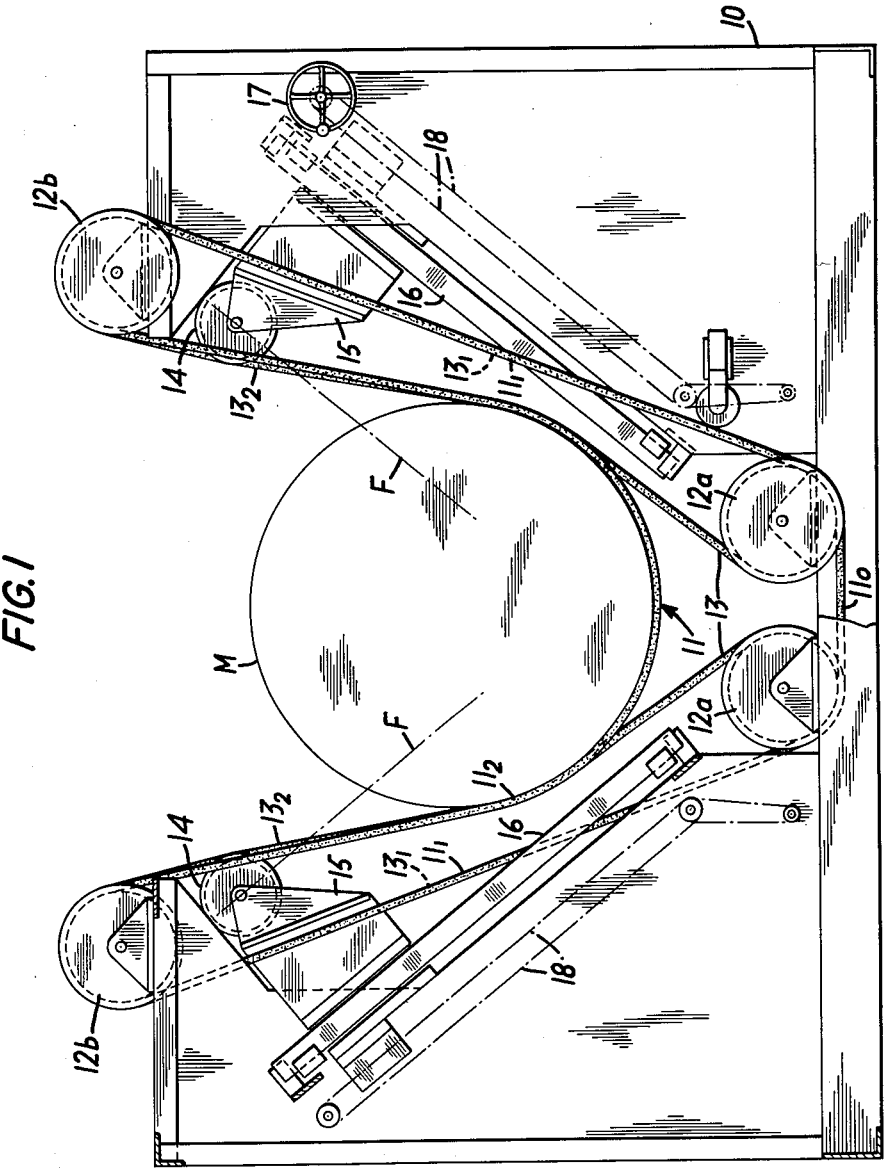
FIG. 1 is a diagrammatic view in elevation of a first form of construction of machine according to the invention, adjusted for driving a mould of large diameter.
Figure 2:
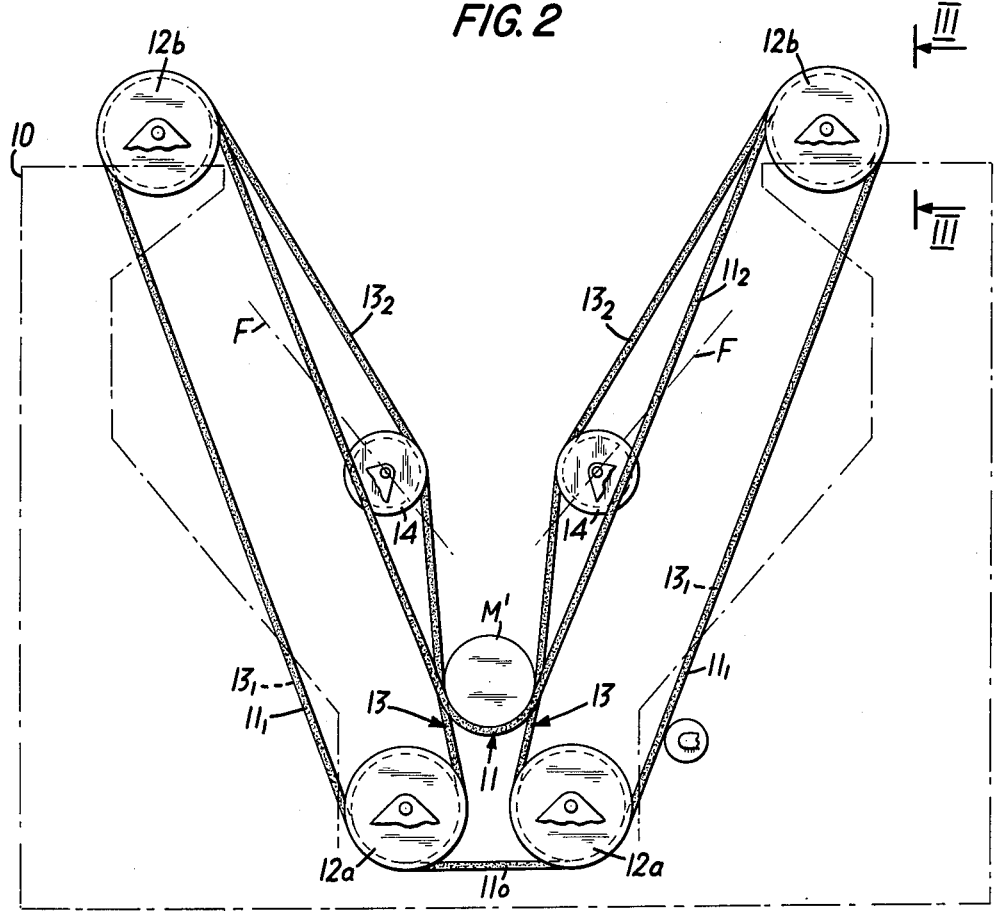
FIG. 2 is similar to FIG. 1, but in which the machine is regulated for driving a mould of small diameter.
Figure 3:
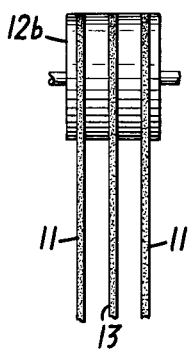
FIG. 3 is a side view of one of the pulleys of the machine in the direction of the arrows III—III of FIG. 2.

Reference will first be made to FIGS. 1 to 3, in which there can be seen at 10 the frame of a machine according to the invention, intended to drive in rotation a cylindrical mould M for the manufacture of pipes of cement or other materials by centrifuging, and provided with guiding means for stabilizing the mould during the period when the mould is driven in rotation.

The mould M is carried and driven in rotation by a suitable number of belts 11. Each carrier belt 11 passes over four pulleys mounted on the frame 10: two lower pulleys 12a, close together, and two upper pulleys 12b, spaced further apart. The carrier belt 11 comprises: a straight lower side $11_0$ between the lower points of the lower pulleys 12a; two outer sides $11_1$, each of which extends between the outer sides of a pair of pulleys 12a and 12b; and a continuous inner side $11_2$ which hangs in the form of a cradle from two upper pulleys 12b. It is on this continuous side $11_2$ in the form of a cradle of the belt 11 that the mould M is carried, and it is by this side that it is driven.

With the object of stabilizing the mould M while it is being driven in rotation, guiding means are provided for the mould M. In accordance with these means, each side pair of pulleys 12a and 12b receives an auxiliary stabilizing belt 13 (FIG. 3) in the vicinity of the carrier belt 11 and preferably between two adjacent carrier belts. Each stabilizing belt 13 comprises: an outer side $13_1$ which extends between the outer sides of the pulleys 12a and 12b, and which is aligned with the side $11_1$ of the belt 11; and an inner side $13_2$ which extends between the inner sides of the pulleys 12a and 12b.

With the inner side $13_2$ of each auxiliary stabilizing belt 13 is associated a regulating roller 14, the position of which is adjustable in order to give the side $13_2$ the shape which is most suitable for guiding a mould M of any given diameter with a pre-determined play, which is either nil or very small. The roller 14 is mounted on a trolley 15 slidably mounted on a slide 16, the inclination of which to the vertical is chosen in a suitable manner and is preferably slightly greater than the inclination of a straight line passing through the axes of the pulleys 12a and 12b. The trolley or carriage 15 remains locked in any determined position. It can be displaced in the direction F from one position to another by a control system comprising a hand-wheel 17 and a chain 18.

For a mould M of large diameter, the carriages 15 are arranged in the upper portion as shown in FIG. 1, so that the sides $13_2$ are only slightly deflected by the rollers 14 and the free portions of these sides contiguous with the mould are very slightly inclined to the vertical. For a mould M' of small diameter, the carriages 15 are arranged in the lower portion, as shown in FIG. 2, so that the sides $14_2$ are considerably deflected by the rollers and the free portions of these sides contiguous with the mould again remain very slightly inclined to the vertical. For moulds of intermediate diameters, the carriages 15 are arranged in an intermediate position corresponding, so that the free portions of the sides 13₂ contiguous with the mould remain always slightly inclined to the vertical.

In all cases, this slight inclination to the vertical is such that it is sufficiently small for the mould M to be enclosed in an effective manner, for example over a sector of about 160°, but it is also sufficiently great for the mould M to be readily engaged before and disengaged after the centrifuging operation.

During working, the belts 11 carry and drive the mould in rotation, while the belts 13 hold it perfectly stable and prevent it shaking or oscillating.

Figure 4:
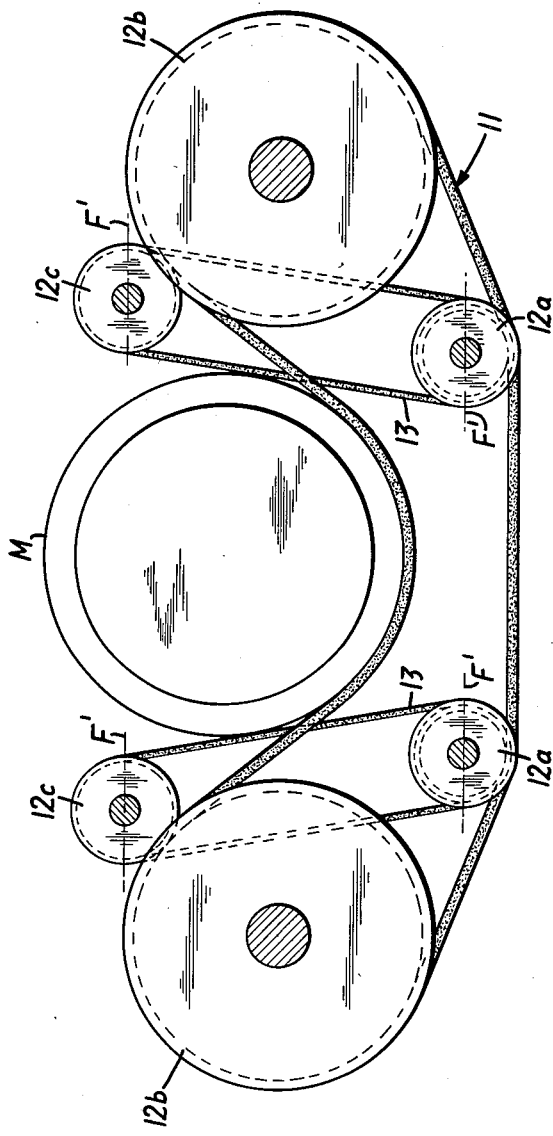
FIG. 4 is a diagrammatic view in elevation of a second form of construction of machine according to the invention, adjusted for driving a mould of large diameter.
Figure 5:
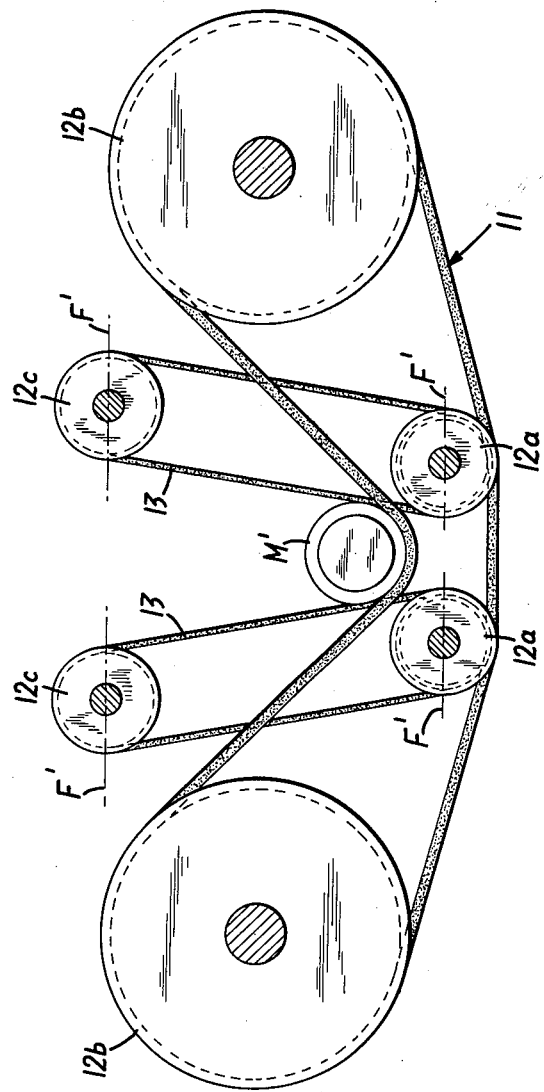
FIG. 5 is similar to FIG. 4, but in which the machine is regulated for driving a mould of small diameter.

Reference will now be made to FIGS. 4 and 5, in which is shown an alternative form of the arrangement according to the invention. In accordance with this alternative, each of the carrier pulleys 11 passes over two large pulleys 12b and over two small pulleys 12a, while the guiding means for the mould M comprise a pair of independent auxiliary belts 13, one of which is engaged over a pulley 12a and over an upper pulley 12c, while the other is engaged on the other pulley 12a and over a second upper pulley 12c symmetrically disposed with respect to the first.

The straight line connecting the axes of the pulleys 12a and 12c of each pair is slightly inclined, for example by about 10°, so that the side of the auxiliary belt 13 ensures appropriate stabilization of the mould M while permitting this latter to be disengaged. Each pair of pulleys 12a—12c is mounted on an adjusting support displaceable as a unit along a horizontal direction F′ so as to be able to take up a position in which the sides of the belt 13 have suitable contact with the mould M, irrespective of the diameter of this mould, the mould M being thus guided with a pre-determined play, either nil or very small. The pairs of pulleys 12a—12c are moved farther apart for a mould M of large diameter (FIG. 4) and are brought closer together for a mould M′ of small diameter (FIG. 5) while they are given an intermediate relative position for a mould of intermediate diameter.

The operation is the same as that which has been previously described. The belts 11 carry and drive the mould in rotation, while the auxiliary belts 13 ensure the stability of the mould by enveloping it over a sector of about 160°.

Reference will now be made to FIGS. 6 and 7, in which is shown a further alternative form of the arrangement according to the invention. In accordance with this alternative, each carrier belt 11 which passes over the pulleys 12a and 12b as in FIG. 1, is in this case itself given a stabilizing function by guiding means which are applied to it. These means comprise two pulleys 19 which are each provided with a deep groove 20 and receives at its periphery annular elastic strips 21 which fill up the groove 20. The pulleys 19 are pushed on each side of the mould M by adjustable mechanisms, preferably along two directions F′ and F‴ in an independent manner. These mechanisms may be of the carriage type described by way of example with reference to FIG. 1 for a direction F but doubled so as to provide adjustments along two directions F′ and F‴, or they may be of any other appropriate type, for example of the screw type, hydraulic jacks, etc. The pulleys 19 are adjusted, irrespective of the diameter of the mould M, in such manner as to make contact or almost to make contact at 21 with the said mould on each side of its rolling tracks at the height of its axis. The belt 11 deeply engaged in the groove 20, then forms an open angle and limits the lateral displacement or jolting movement of the mould M to a pre-determined play which is nil or very small, the mould being enveloped over a sector of about 160°.

When the elastic bands 21 do not touch the mould, only the form given to the carrier belt 11 by the pulleys 19 ensures the stabilization of the mould, and the bands 21 play the part of a safety device and act occasionally. When the elastic bands 21 touch the mould, they continuously add their action to that of the form of the belt in stabilizing the mould.

As in the previous case, the mould is prevented from shaking while it is being rotated, irrespective of the diameter of the said mould.

It will of course be understood that the invention is not limited to the forms of construction described and shown, but includes all alternative forms.

What is claimed is:

In an apparatus for centrifugally manufacturing cement pipe and the like, having a rotatable mold substantially circular in cross-section into which is introduced the material to be centrifugally molded and at least one driven endless belt having a span cradling the mold and rotatably driving it, the improvement which comprises, means for stabilizing the mold during rotation thereof comprising guiding means on opposite sides of the mold cooperatively and jointly with said endless belt engaging the mold periphery through an arc of about 160°, means for adjusting said guiding means for jointly with said belt limiting the lateral movement of said drum during rotation thereof, said adjusting means comprising means for adjusting said guiding means to accommodate molds of circular cross-section of different diameters individually in said apparatus and maintain said guiding means and belt engaging the periphery of said molds through said arc of about 160°, said guiding means comprising two endless auxiliary belts disposed on opposite sides of said mold, two pulleys one each on each side of said mold usable in common by said driving belt and a respective one of said auxiliary belts, another pair of pulleys spaced from the first mentioned two pulleys for guiding a respective one of said auxiliary belts, and a guide pulley for each of said auxiliary belts each positionable in various positions in which the axis thereof is moved toward or away from the mold for controlling the movement of a span of a respective one of said auxiliary belts in a direction toward or away from said mold thereby to control the arcuate extent of engagement of each of said auxiliary belts with the periphery of said mold in the apparatus.

References Cited in the file of this patent
UNITED STATES PATENTS

| | | |
|---|---|---|
| 1,837,324 | Hume | Dec. 22, 1931 |
| 2,042,395 | Halkyard | May 26, 1936 |
| 2,589,950 | Francisco Sanchez Medina et al. | Mar. 18 1952 |
| 2,859,151 | Usab et al. | Nov. 4, 1958 |
| 2,904,836 | Jefferson et al. | Sept. 22, 1959 |
| 2,962,787 | Gateau | Dec. 6, 1960 |